(12) United States Patent
Choi et al.

(10) Patent No.: US 9,335,857 B2
(45) Date of Patent: *May 10, 2016

(54) DISPLAY APPARATUS

(71) Applicant: SAMSUNG DISPLAY CO., LTD, Yongin, Gyeonggi-Do (KR)

(72) Inventors: Moonsung Choi, Incheon (KR); Incheol Kim, Asan-si (KR); Seongmo Hwang, Seongnam-si (KR); Jihong Park, Suwon-si (KR); Il Ho Lee, Hwaseong-si (KR); Seungho Nam, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/742,554

(22) Filed: Jun. 17, 2015

(65) Prior Publication Data

US 2015/0286329 A1    Oct. 8, 2015

Related U.S. Application Data

(63) Continuation of application No. 13/844,211, filed on Mar. 15, 2013, now Pat. No. 9,092,103.

(30) Foreign Application Priority Data

Sep. 4, 2012  (KR) .......................... 10-2012-0097827

(51) Int. Cl.
*G06F 3/041* (2006.01)
*G06F 3/044* (2006.01)
*G06F 3/045* (2006.01)

(52) U.S. Cl.
CPC .............. *G06F 3/0412* (2013.01); *G06F 3/044* (2013.01); *G06F 3/045* (2013.01); *G06F 3/0416* (2013.01); *G06F 2203/04101* (2013.01); *G06F 2203/04111* (2013.01); *G06F 2203/04112* (2013.01)

(58) Field of Classification Search
CPC ....... G06F 3/0416; G06F 3/044; G06F 3/045; G06F 2203/04112; G06F 2203/04101; G06F 2203/04111

See application file for complete search history.

(56) References Cited

U.S. PATENT DOCUMENTS

| | | | |
|---|---|---|---|
| 8,072,430 B2 | 12/2011 | Kim et al. | |
| 2004/0008171 A1 | 1/2004 | Kimura et al. | |
| 2006/0209055 A1 | 9/2006 | Wakita | |
| 2008/0018613 A1* | 1/2008 | Kim | G06F 3/0412 345/173 |
| 2008/0062148 A1* | 3/2008 | Hotelling | G02F 1/13338 345/174 |
| 2009/0051842 A1* | 2/2009 | Kim | G02F 1/134363 349/40 |
| 2010/0238134 A1 | 9/2010 | Day et al. | |
| 2010/0302202 A1 | 12/2010 | Takeuchi et al. | |

(Continued)

FOREIGN PATENT DOCUMENTS

KR    10-2008-0012594 A    2/2008

(Continued)

*Primary Examiner* — Shaheda Abdin
(74) *Attorney, Agent, or Firm* — Innovation Counsel LLP

(57) ABSTRACT

A display apparatus includes a display panel that displays an image during a display period and detects a touch event during a non-display period. The display panel includes a plurality of common electrodes and a plurality of data lines capacitively coupled to the common electrodes during the non-display period. Coordinate information of a position at which the touch event occurs is calculated on the basis of a capacitance variation of the common electrodes and the data lines.

18 Claims, 20 Drawing Sheets

(56) References Cited

U.S. PATENT DOCUMENTS

| | | |
|---|---|---|
| 2011/0001714 A1 | 1/2011 | Sasaki |
| 2011/0025635 A1 | 2/2011 | Lee |
| 2012/0062497 A1 | 3/2012 | Rebeschi et al. |
| 2012/0075238 A1 | 3/2012 | Minami et al. |
| 2012/0081320 A1 | 4/2012 | Hwang et al. |

FOREIGN PATENT DOCUMENTS

| | | |
|---|---|---|
| KR | 10-2010-0080026 A | 7/2010 |
| KR | 10-2011-0100377 A | 9/2011 |
| KR | 10-2011-0124472 A | 11/2011 |
| KR | 10-2012-0004232 A | 1/2012 |

* cited by examiner

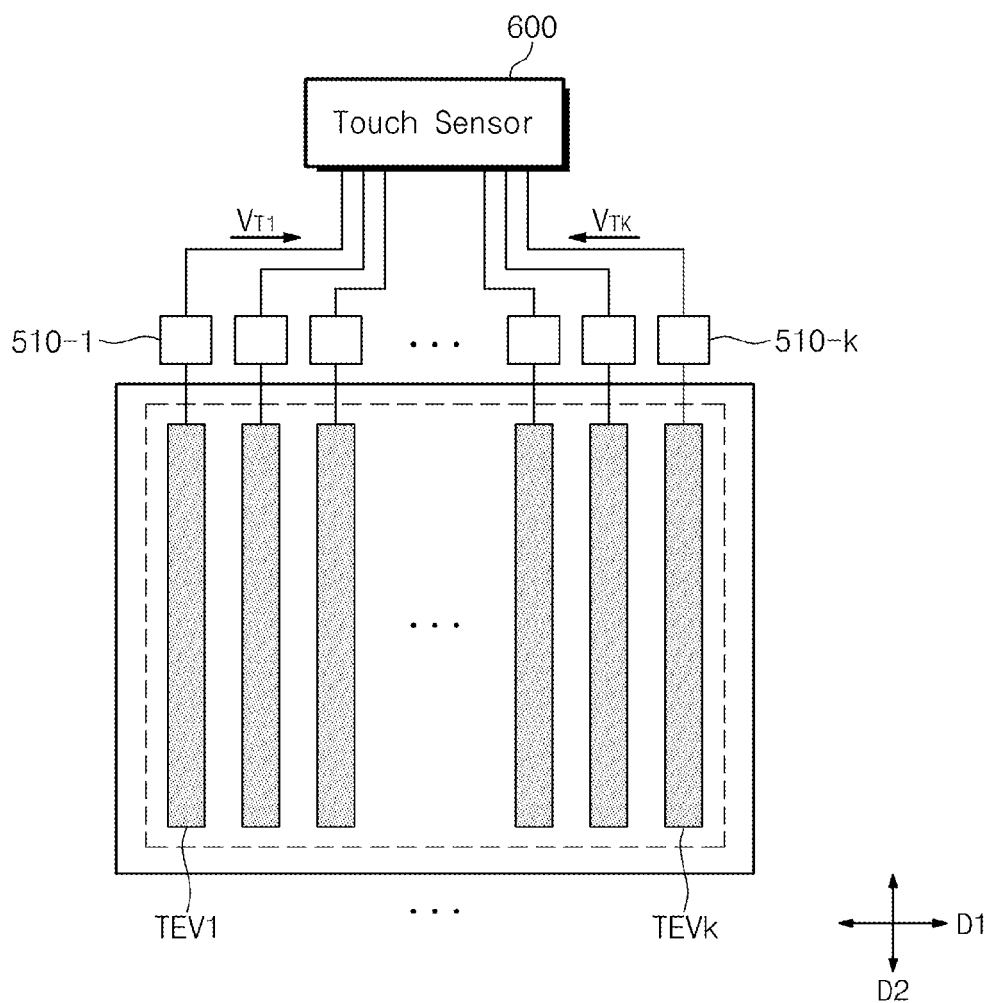

Fig. 12
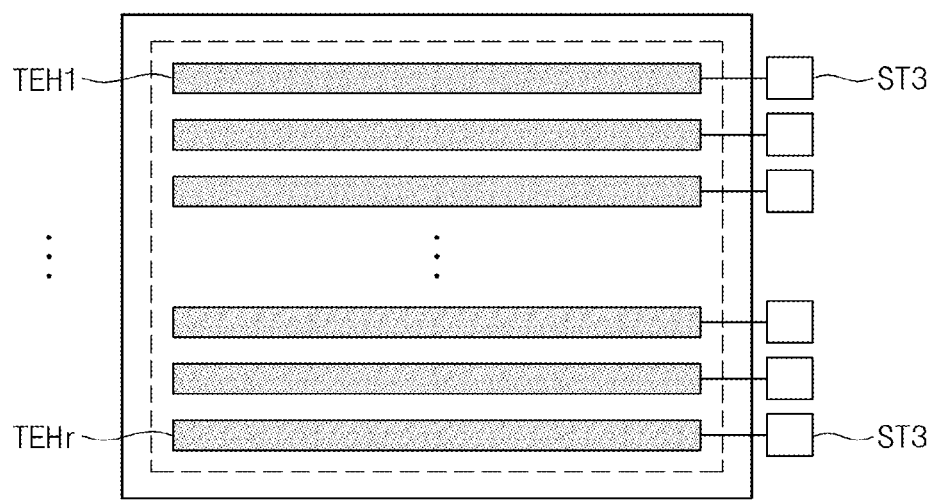
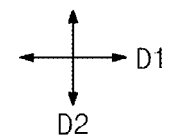

DISPLAY APPARATUS

CROSS-REFERENCE TO RELATED APPLICATION

This application is a continuation application of U.S. patent application Ser. No. 13/844,211 filed on Mar. 15, 2013, which claims priority to Korean Patent Application No. 10-2012-0097827, filed on Sep. 4, 2012, in the Korean Intellectual Property Office (KIPO), and all the benefits accruing therefrom under 35 U.S.C. §119, the contents of the prior applications being herein incorporated by reference.

BACKGROUND

1. Field of Disclosure

The present disclosure relates to a display apparatus. More particularly, the present disclosure relates to a display apparatus capable of detecting a touch event.

2. Description of the Related Art

A touch panel obtains the two-dimensional coordinate information of the position at which a touch event occurs when a user touches the touch panel. In general, the touch panel is attached to a display apparatus, and the display apparatus displays information in response to the coordinate information provided from the touch panel.

In recent years, demand for touch panels to communicate with electronic devices instead of input devices, e.g., a keyboard, a mouse, etc., has increased in various fields, When the touch panel is attached to outside of the display apparatus, brightness of images displayed on the display apparatus is lowered and a viewing angle of the display apparatus is lowered.

SUMMARY

The present disclosure provides a display apparatus having a touch panel function.

In one aspect, a display apparatus includes a display panel that includes a first substrate providing a touch surface, wherein the display panel displays an image during a display period, and detects a touch event during a non-display period; and a touch sensor configured to calculate a coordinate information of a position at which the touch event occurs.

The display panel may include a plurality of gate lines disposed on the first substrate and extended in a first direction; a plurality of common electrodes that receive a reference voltage during the display period and receive sensing signals during the non-display period, the common electrodes being extended in the first direction; and a plurality of data lines that receive data voltages during the display period, the data lines being extended in a second direction crossing the first direction, and a portion of the data lines being capacitively coupled to the common electrodes during the non-display period.

The display apparatus may further include a first driving controller that applies the data voltages to the display panel during the display period and applies a capacitance variation received from the display panel to the touch sensor during the non-display period; and a second driving controller that applies the reference voltage to the display panel during the display period and applies the sensing signals to the display panel during the non-display period.

The display apparatus may further include a first data line group that applies the capacitance variation received from the display panel to the first driving controller during the non-display period; and a second data line group alternately arranged with the first data line group.

The first driving controller may include a first switching part connected to the first data line group and a second switching part connected to the second data line group, and the second switching part comprises a plurality of transistors respectively connected to the data lines included in the second data line group.

The first switching part may include a plurality of CMOS transistors respectively connected to the data lines included in the first data line group.

Each of the CMOS transistors may include an n-type transistor and a p-type transistor, a control electrode of the n-type transistor and a control electrode of the p-type transistor commonly receive a switching signal, one of the n-type transistor and the p-type transistor is turned on in accordance with a level of the switching signal, and the other one of the n-type transistor and the p-type transistor is turned off in accordance with the level of the switching signal.

Input and output electrodes of the n-type transistor and input and output electrodes of the p-type transistor are commonly connected to a corresponding data line of the first data line group, one of the n-type transistor and the p-type transistor applies the data voltages to the display panel, and the other one of the n-type transistor and the p-type transistor applies the capacitance variation in the display panel to the touch sensor.

The second driving controller may include a plurality of CMOS transistors to apply the sensing signals to the common electrodes.

The display panel may further include a plurality of common lines respectively connected to the common electrodes.

The common lines are disposed on a same layer as the gate lines.

The CMOS transistors are respectively connected to the common lines.

Each of the CMOS transistors comprises an n-type transistor and a p-type transistor, a control electrode of the n-type transistor and a control electrode of the p-type transistor commonly receive a switching signal, one of the n-type transistor and the p-type transistor is turned on in accordance with a level of the switching signal, and the other one of the n-type transistor and the p-type transistor is turned off in accordance with the level of the switching signal.

Input and output electrodes of the n-type transistor and input and output electrodes of the p-type transistor are commonly connected to a corresponding common line of the common lines, one of the n-type transistor and the p-type transistor applies the reference voltage to the common lines, and the other one of the n-type transistor and the p-type transistor applies the sensing signals to the common lines.

The display apparatus may further include a plurality of pixels each connected to a corresponding gate line of the gate lines and a corresponding data line of the data lines.

The display apparatus may further include a liquid crystal layer disposed between the first substrate and a second substrate facing the first substrate.

Each of the pixels may include a thin film transistor connected to the corresponding gate line and the corresponding data line; and a pixel electrode connected to the thin film transistor.

The pixel electrode is disposed on a layer different from a layer on which the common electrodes are disposed.

In another aspect, a display apparatus includes a display panel that includes a first substrate providing a touch surface, wherein the display panel displays an image during a display period, and detects a touch event during a non-display period; and a touch sensor that calculates a coordinate information of a position at which the touch event occurs.

The display panel may include a plurality of gate lines disposed on the first substrate and extended in a first direction; a plurality of first common electrodes that receive a reference voltage during the display period and the non-display period and are extended in a second direction crossing the first direction; a plurality of second common electrodes that receives the reference voltage during the display period and receive sensing signals during the non-display period; and a plurality of data lines that receives data voltages during the display period, a portion of the data lines being capacitively coupled to the second common electrodes during the non-display period, wherein the second common electrodes are divided into a plurality of groups arranged in the second direction, each of the groups comprises n (n is an integer number equal to or greater than 2) second common electrodes, and the n second common electrodes are electrically connected to each other and arranged in the first direction.

The display panel may further include a first driving controller that applies the data voltages to the display panel during the display period, and applies a capacitance variation received from the display panel to the touch sensor during the non-display period; and a second driving controller that applies the reference voltage to the display panel during the display period and applies the sensing signals to the display panel during the non-display period.

The display apparatus my further include a first data line group overlapped with the first common electrodes; and a second data line group overlapped with the second common electrodes.

The first driving controller may include a switching part connected to the first data line group and the switching part comprises a plurality of CMOS transistors respectively connected to the data lines included in the first data line group.

The display panel may further include a plurality of first common lines respectively corresponding to the groups of the second common electrodes, and each of the first common lines is connected to the n second common electrodes of corresponding group of the second common electrodes.

The second driving controller may further include a plurality of CMOS transistors respectively connected to the first common lines.

The first common lines are disposed on a same layer as the gate lines.

The display panel may further include at least one second common line to electrically connect the first common electrodes.

The display apparatus may further include a plurality of pixels each connected to a corresponding gate line of the gate lines and a corresponding data line of the data lines.

BRIEF DESCRIPTION OF THE DRAWINGS

The above and other advantages will become readily apparent by reference to the following detailed description when considered in conjunction with the accompanying drawings wherein:

FIG. 7 is a plan view showing a connection relation between the data lines shown in FIG. 5 and the first switching part shown in FIG. 6A;

FIG. 12 is a plan view showing a connection relation between the common electrodes shown in FIG. 9 and the second driving controller shown in FIG. 11;

DETAILED DESCRIPTION

Figure 1:
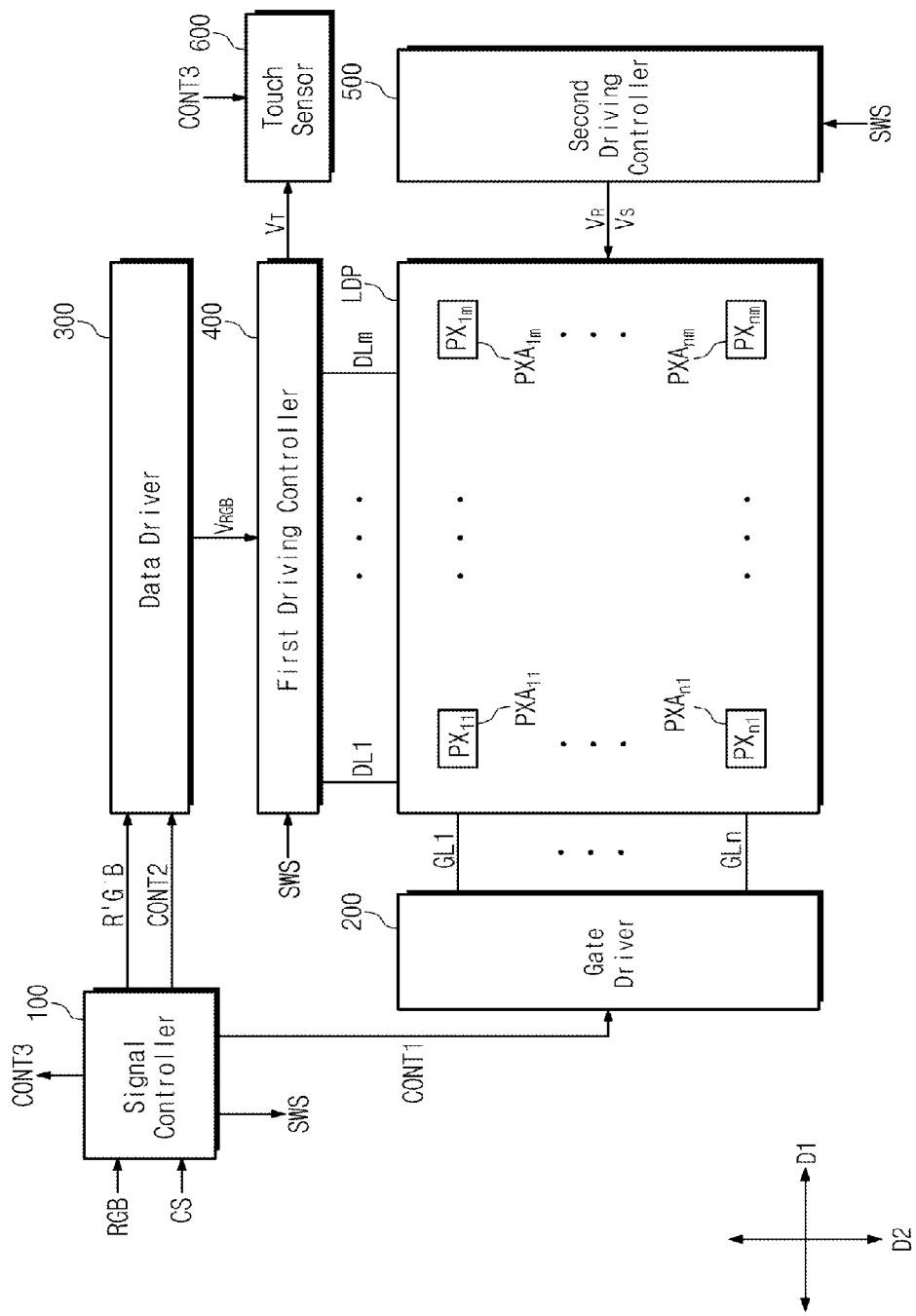
FIG. 1 is a block diagram showing a display apparatus according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be explained in detail with reference to the accompanying drawings.

Figure 2:
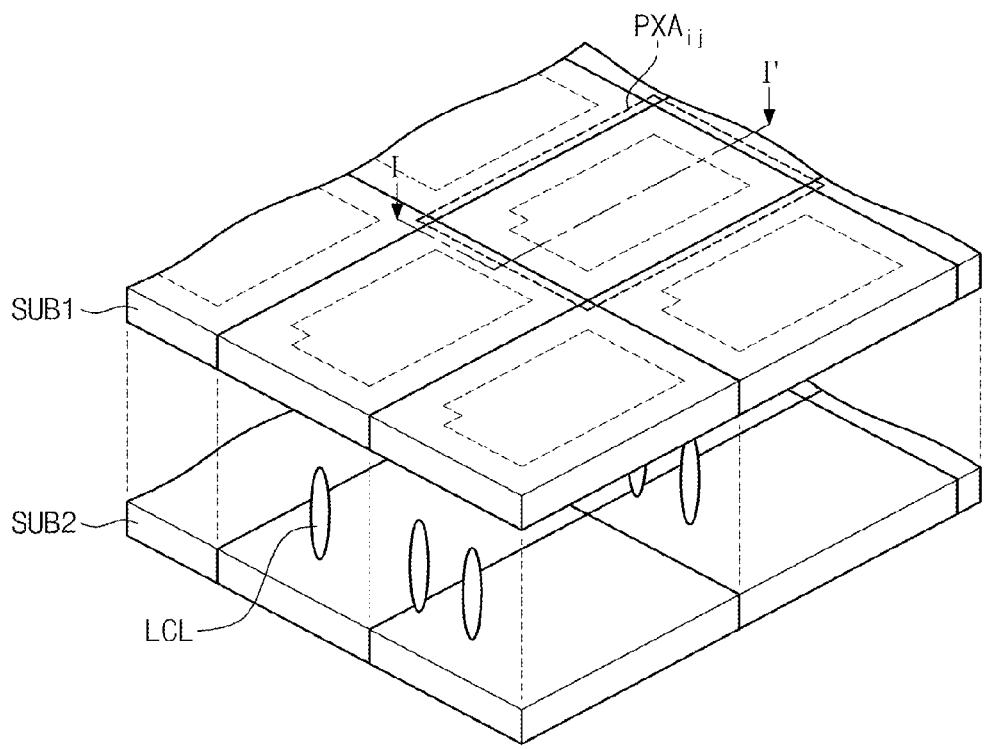
FIG. 2 is a perspective view showing a display panel shown in FIG. 1.
Figure 3:
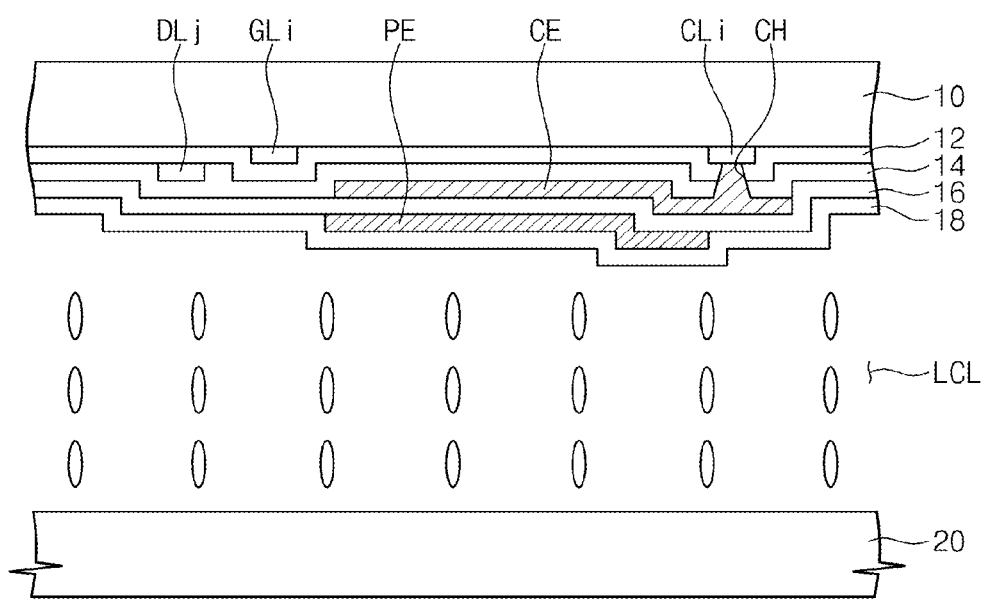
FIG. 3 is a cross-sectional view taken along a line I-I' of FIG. 2.
Figure 4:
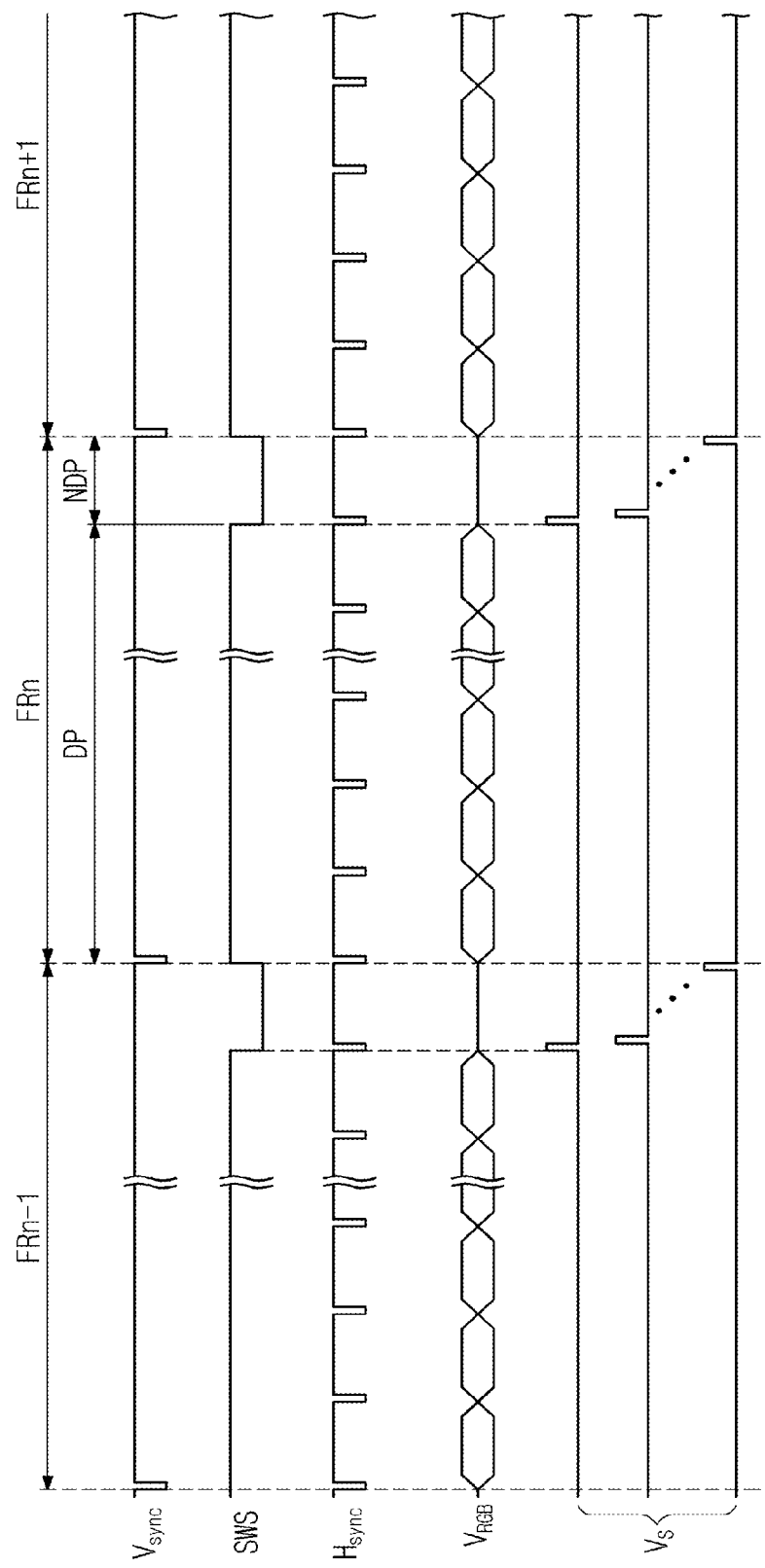
FIG. 4 is a timing diagram showing signals applied to the display apparatus shown in FIG. 1.

FIG. 1 is a block diagram showing a display apparatus according to an exemplary embodiment, FIG. 2 is a perspective view showing a display panel shown in FIG. 1, FIG. 3 is a cross-sectional view taken along a line I-I' of FIG. 2, and FIG. 4 is a timing diagram showing signals applied to the display apparatus shown in FIG. 1.

Referring to FIG. 1, the display apparatus includes a display panel LDP, a signal controller 100, a gate driver 200, a data driver 300, a first driving controller 400, a second driving controller 500, and a touch sensor 600.

The display panel LDP displays an image during a display period DP (refer to FIG. 4) and detects a touch event during a non-display period NDP (refer to FIG. 4).

The display panel LDP may be, but is not limited to, a liquid crystal display panel, an organic light emitting display panel, an electrophoretic display panel, or an electrowetting display panel. In the present exemplary embodiment, the liquid crystal display panel for a liquid crystal display will be described as the display panel LDP. The liquid crystal display further includes a backlight unit (not shown) and a pair of polarizing plates (not shown)

The display panel LDP includes a plurality of gate lines GL1 to GLn, a plurality of data lines DL1 to DLm, and a plurality of pixels PX11 to PXnm. In addition, the display panel LDP includes a plurality of common electrodes CE1 to CEr (explained in more detail below with reference to FIG. 9).

The gate lines GL1 to GLn are extended in a first direction D1 and arranged in a second direction D2. The data lines DL1 to DLm are insulated from the gate lines GL1 to GLn while crossing the gate lines GL1 to GLn. That is, the data lines DL1 to DLm are extended in the second direction D2 and arranged in the first direction D1.

The pixels PX11 to PXnm are arranged in a matrix form to correspond to a plurality of pixel areas PXA11 to PXAnm. Each of the pixels PX11 to PXnm is connected to an adjacent data line of the data lines DL1 to DLm and an adjacent gate line of the gate lines GL1 to GLn.

Referring to FIGS. 2 and 3, the display panel LDP includes a first substrate SUB1, a second substrate SUB2 facing the first substrate SUB1, and a liquid crystal layer LCL disposed between the first substrate SUB1 and the second substrate SUB2.

The first substrate SUB1 provides a touch surface on which a touch event occurs. The touch event may occur directly on the surface of the first substrate SUB1, but the touch event is not required to occur directly on the surface of the first substrate SUB1. That is, an additional layer, e.g., a polarizing plate, a protecting layer, etc., may be disposed on the surface of the first substrate SUB1, and the touch event may occur on the additional layer.

The first substrate SUB1 includes a first base member 10, a plurality of insulating layers, and a plurality of metal layers. Each of the insulating layers may be configured to include an organic layer and/or an inorganic layer. The gate lines GL1 to GLn, the data lines DL1 to DLm, and the pixels PX11 to PXnm are disposed on the first base member 10. Each of the pixel areas PXA11 to PXAnm may be defined by the area between two adjacent gate lines of the gate lines GL1 to GLn and two adjacent data lines of the data lines DL1 to DLm. But each of the pixel areas PXA11 to PXAnm should not be limited to the area between two adjacent gate lines of the gate lines GL1 to GLn and two adjacent data lines of the data lines DL1 to DLm. For example, the area between two adjacent gate lines of the gate lines GL1 to GLn and two adjacent data lines of the data lines DL1 to DLm includes two pixel areas of the pixel areas PXA11 to PXAnm or a portion of one pixel area of the pixel areas PXA11 to PXAnm.

Among the pixel areas PXA11 to PXAnm, one pixel area PXAij has been shown in FIGS. 2 and 3 as a representative example. The one pixel area PXAij has a corresponding pixel. The corresponding pixel includes a thin film transistor (not shown) connected to the adjacent gate line of the gate lines and the adjacent data line of the data lines and a pixel electrode PE connected to the thin film transistor.

An i-th gate line GLi and an i-th common line CLi are disposed on the surface of the first base member 10. FIG. 3 shows the i-th gate line GLi and one common line CLi.

A first insulating layer 12 is disposed on the first base member 10 to cover the i-th gate line GLi and the i-th common line CLi. A j-th data line DLj is disposed on the first insulating layer 12. FIG. 3 shows the j-th data line DLj.

A second insulating layer 14 is disposed on the first insulating layer 12 to cover the j-th data line DLj and the common electrode CE is disposed on the second insulating layer 14. As an example, one common electrode CE has been shown in FIG. 3. The common electrode CE is connected to the i-th common line CLi through a contact hole CH formed through the first insulating layer 12 and the second insulating layer 14.

A third insulating layer 16 is disposed on the second insulating layer 14 to cover the common electrode CE, and the pixel electrode PE is disposed on the third insulating layer 16. A fourth insulating layer 18 is disposed on the third insulating layer 16 to cover the pixel electrode PE.

The second substrate SUB2 includes a second base member 20. Although not shown in figures, the second substrate SUB2 further includes a color filter layer disposed on a surface of the second base member 20.

The positions of the common electrode CE and the pixel electrode PE should not be limited to the structure shown in FIGS. 2 and 3. That is, the positions of the common electrode CE and the pixel electrode PE may be exchanged with each other, or the common electrode CE and the pixel electrode PE may be disposed on the same layer.

Referring to FIG. 1, the signal controller 100 receives input image signals RGB and converts the input image signals RGB to image data R'G'B' appropriate for an operation mode of the display panel LDP. In addition, the signal controller 100 receives various control signals CS, e.g., a vertical synchronization signal Vsync (refer to FIG. 4), a horizontal synchronization signal Hsync (refer to FIG. 4), a main clock signal, a data enable signal, etc., and outputs first, second, and third control signals CONT1, CONT2, and CONT3 and a switching signal SWS.

The gate driver 200 outputs gate signals to the gate lines GL1 to GLn in response to the first control signal CONT1. The first control signal CONT1 includes a vertical start signal that starts an operation of the gate driver 200, a gate clock signal that determines an output timing of the gate signals, and an output enable signal that determines an ON-pulse width of the gate signals.

The data driver 300 receives the second control signal CONT2 and the image data R'G'B'. The data driver 300 converts the image data R'G'B to data voltages $V_{RGB}$ and applies the data voltages $V_{RGB}$ to the first driving controller 400.

The second control signal CONT2 includes a horizontal start signal that starts an operation of the data driver 300, a polarity inversion signal that inverts a polarity of the data voltages $V_{RGB}$, and an output indicating signal that determines an output timing of the data voltages $V_{RGB}$ from the data driver 300.

In addition, the second control signal CONT2 includes a data enable signal to control the state, on or off, of the data voltages $V_{RGB}$. The data enable signal is used to define the display period DP and the non-display period NDP. For instance, the data enable signal has a phase opposite to that of the switching signal SWS.

The first driving controller 400 receives the switching signal SWS. The switching signal SWS has a high period and a low period. The first driving controller 400 applies the data voltages $V_{RGB}$ to the display panel LDP in response to the switching signal SWS. In addition, the first driving controller 400 applies a capacitance variation occurring on the display panel LDP to the touch sensor 600 in response to the switching signal SWS.

In detail, the first driving controller 400 applies the data voltages $V_{RGB}$ to the data lines DL1 to DLm during the display period DP (refer to FIG. 4), which corresponds to the high period of the switching signal SWS. The first driving controller 400 applies the capacitance variation occurring on the display panel LDP to the touch sensor 600 during the non-display period NDP (refer to FIG. 4), which corresponds to the low period of the switching signal SWS. The capacitance variation is calculated from signals $V_T$ (hereinafter, referred to as touch signals) by the first driving controller 400.

The second driving controller 500 receives the switching signal SWS. The second driving controller 500 applies a reference voltage $V_R$ to the display panel LDP during the display period DP, which corresponds to the high period of the switching signal SWS. The second driving controller 500 applies sensing signals $V_S$ to the display panel LDP during the non-display period NDP, which corresponds to the low period of the switching signal SWS.

The touch sensor 600 receives the third control signal CONT3. The third control signal CONT3 includes a clock signal and an enable signal. In addition, the third control signal CONT3 may include the switching signal SWS. Different from what is shown in FIG. 1, the switching signal SWS may be applied to the first driving controller 400 and the second driving controller 500 from the touch sensor 600.

The touch sensor 600 calculates coordinate information of a position at which the touch event occurs. The touch sensor 600 calculates the coordinate information of the position at which the touch event occurs from the touch signals $V_T$ provided from the first driving controller 400. The configuration and function of the touch sensor 600 will be described in detail with reference to FIG. 8.

Referring to FIG. 4, the vertical synchronization signal Vsync defines a plurality of frames FRn−1, FRn, and FRn+1.

The switching signal SWS has a high period and a low period in each frame FRn−1, FRn, and FRn+1. The high period of the SWS corresponds to the display period DP and the low period of the SWS corresponds to the non-display period NDP of each of the frame periods FRn−1, FRn, and FRn+1. The switching signal SWS has the high level in the display period DP and the low level in the non-display period NDP.

The horizontal synchronization signal Hsync defines a plurality of horizontal periods of the data voltages $V_{RGB}$ output from the data driver 300.

The sensing signals $V_S$ are activated during the non-display period NDP. The sensing signals $V_S$ have different activation periods. Although not shown in FIG. 4 in detail, each of the sensing signals $V_S$ has a plurality of pulse signals each having a period of equal to or smaller than about 10 μs.

Figure 5:
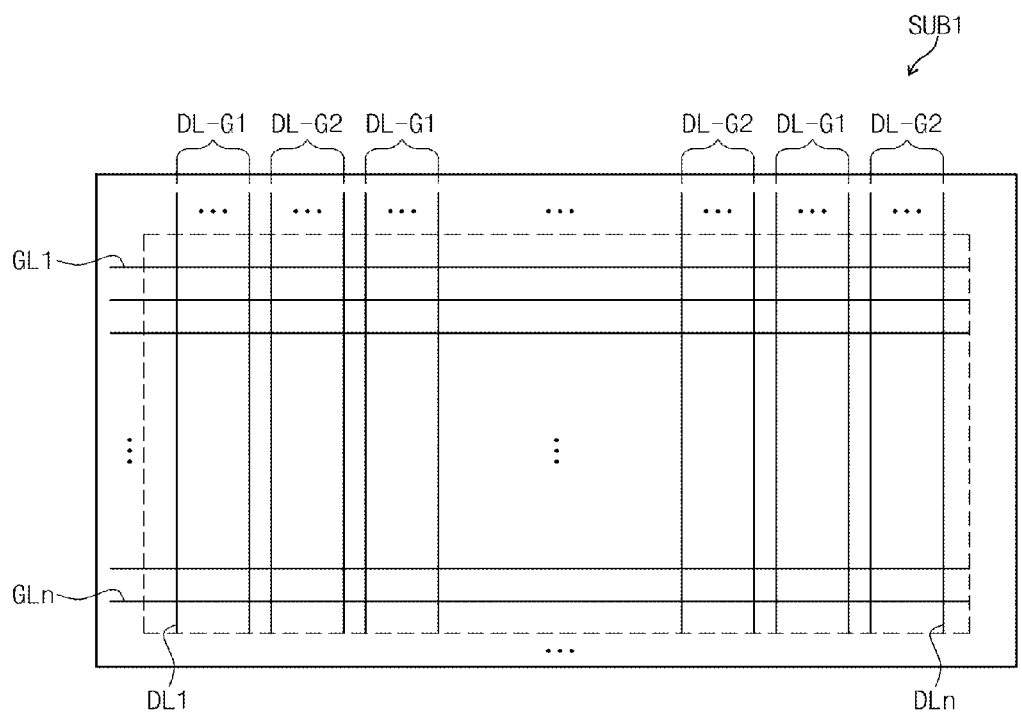
FIG. 5 is a plan view showing a plurality of data lines and a plurality of gate lines disposed on the display panel.
Figure 6A:
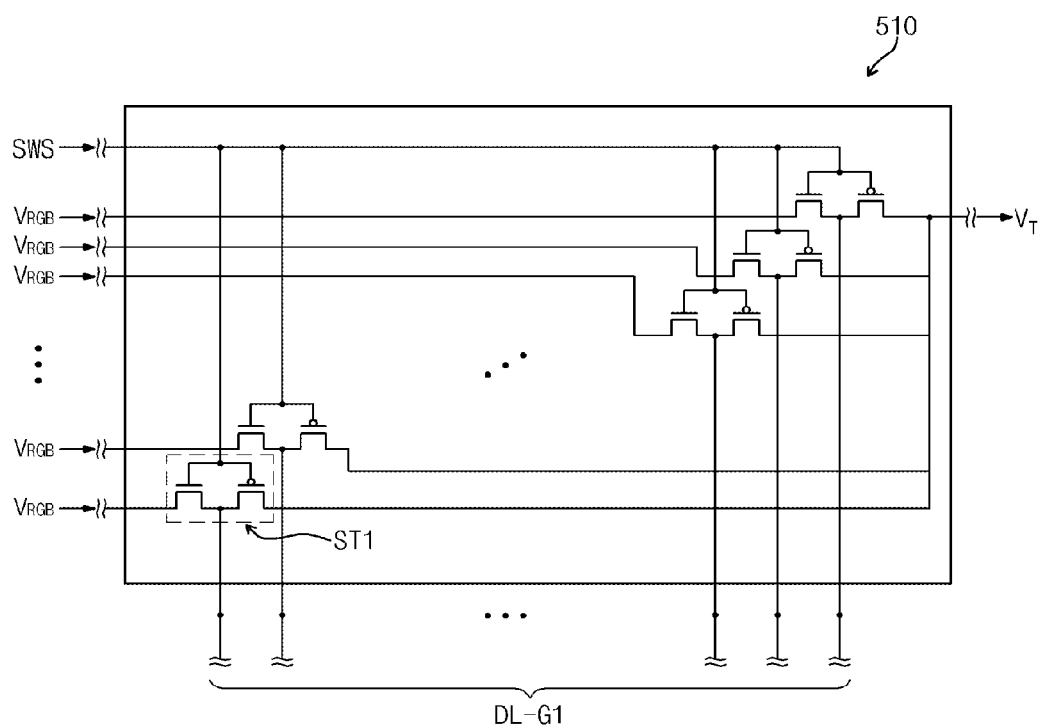
FIGS. 6A and 6B are circuit diagrams showing a first switching part and a second switching part of a first driving controller shown in FIG. 1.
Figure 6B:
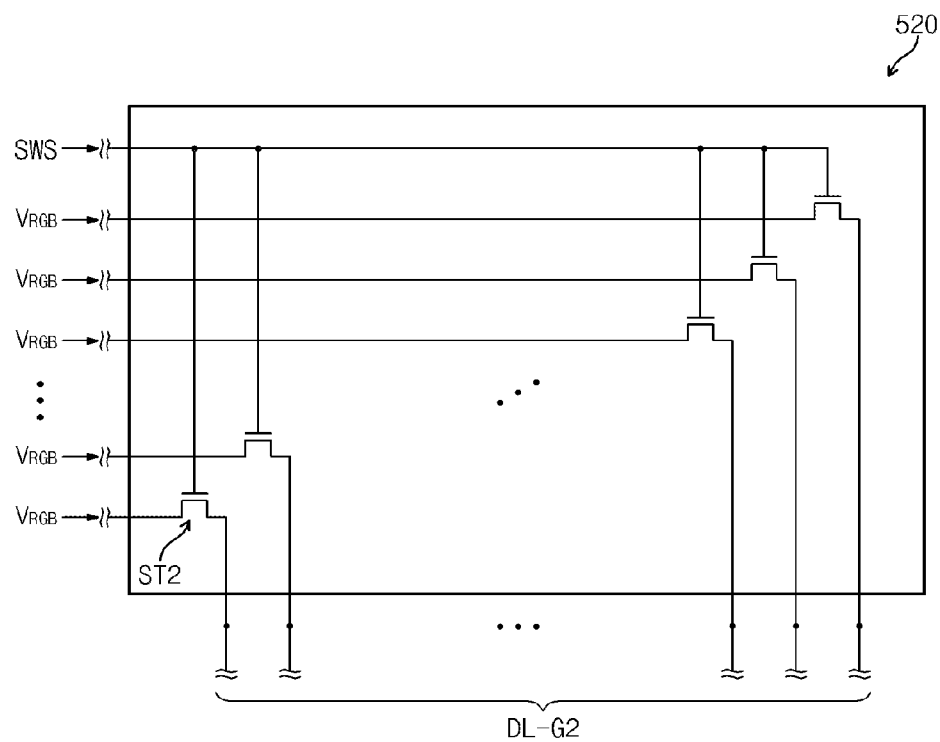

FIG. 5 is a plan view showing the data lines and the gate lines disposed on the display panel, and FIGS. 6A and 6B are circuit diagrams showing a first switching part and a second switching part of a first driving controller shown in FIG. 1.

Referring to FIG. 5, the data lines DL1 to DLm are divided into first data line groups DL-G1 and second data line groups DL-G2. The first data line groups DL-G1 and the second data line groups DL-G2 are alternately arranged with each other.

The first data line groups DL-G1 and the second data line groups DL-G2 receive the data voltages $V_{RGB}$ during the display period DP.

The first data line groups DL-G1 and the second data line groups DL-G2 are distinct from each other by their function during the non-display period NDP. As described below, the first data line groups DL-G1 is capacitively coupled to the common electrodes CE1 to CEr (described in more detail below with respect to FIG. 9) during the non-display period NDP. Due to the capacitive coupling, capacitors are formed between the first data line groups DL-G1 and the common electrodes CE1 to CEr. When the touch event occurs, a capacitance variation occurs at a cross point, at the position at which the touch event occurs, among cross points formed by the first data line groups DL-G1 and the common electrodes CE1 to CEr.

The first data line groups DL-G1 applie the touch signals $V_T$ to the first driving controller 400 during the non-display period NDP, but the second data line groups DL-G2 do not apply the touch signals $V_T$ to the first driving controller 400 during the non-display period NDP.

Referring to FIG. 6A, a first data line group DL-G1 of the first data line groups DL-G1 is connected to the first switching part 510, which is part of the first driving controller 400. The first data line group DL-G1 includes a plurality of data lines, and the first switching part 510 includes a plurality of switching devices ST1. The switching devices ST1 of the first switching part 510 are respectively connected to the data lines of the first data line group DL-G1.

Each switching device ST1 of the first switching part 510 may be, for example, a CMOS transistor. The CMOS transistor includes an n-type MOS transistor and a p-type MOS transistor. A control electrode of the n-type MOS transistor is connected to a control electrode of the p-type MOS transistor to receive the switching signal SWS. An input electrode of the n-type MOS transistor receives the data voltages $V_{RGB}$. An output electrode of the p-type MOS transistor is connected to the touch sensor 600. An output electrode of the n-type MOS transistor and an input electrode of the p-type MOS transistor are commonly connected to the first data line group DL-G1.

When the switching signal SWS having an inverted phase is used, the output electrode of the n-type MOS transistor is connected to the touch sensor 600 and the input electrode of the p-type MOS transistor receives the data voltages $V_{RGB}$.

Referring to FIG. 6B, a second data line group DL-G2 of the second data line groups DL-G2 is connected to the second switching part 520, which is part of the first driving controller 400. The second data line group DL-G2 includes a plurality of data lines, and the second switching part 520 includes a plurality of switching devices ST2. The switching devices ST2 of the second switching part 520 are respectively connected to the data lines of the second data line group DL-G2.

Each switching device ST2 of the second switching part 520 may be an n-type MOS transistor. A control electrode of the n-type MOS transistor receives the switching signal SWS. The n-type MOS transistor is turned on during the display period DP and turned off during the non-display period NDP responding to the switching signal SWS.

An input electrode of the n-type MOS transistor receives the data voltages $V_{RGB}$ and an output electrode of the n-type MOS transistor is connected to the second data line group DL-G2. The n-type MOS transistor provides a corresponding voltage of the data voltages $V_{RGB}$ with a corresponding data line of the second data line group DL-G2 during the display period DP, and does not provides a voltage with the corresponding data line during the non-display period NDP.

When the switching signal SWS having an inverted phase is used, each switching device ST2 may be a p-type MOS transistor. In addition, the second data line group DL-G2 may be directly connected to the data driver 300. That is, the second switching part 520 may be omitted.

Figure 8:
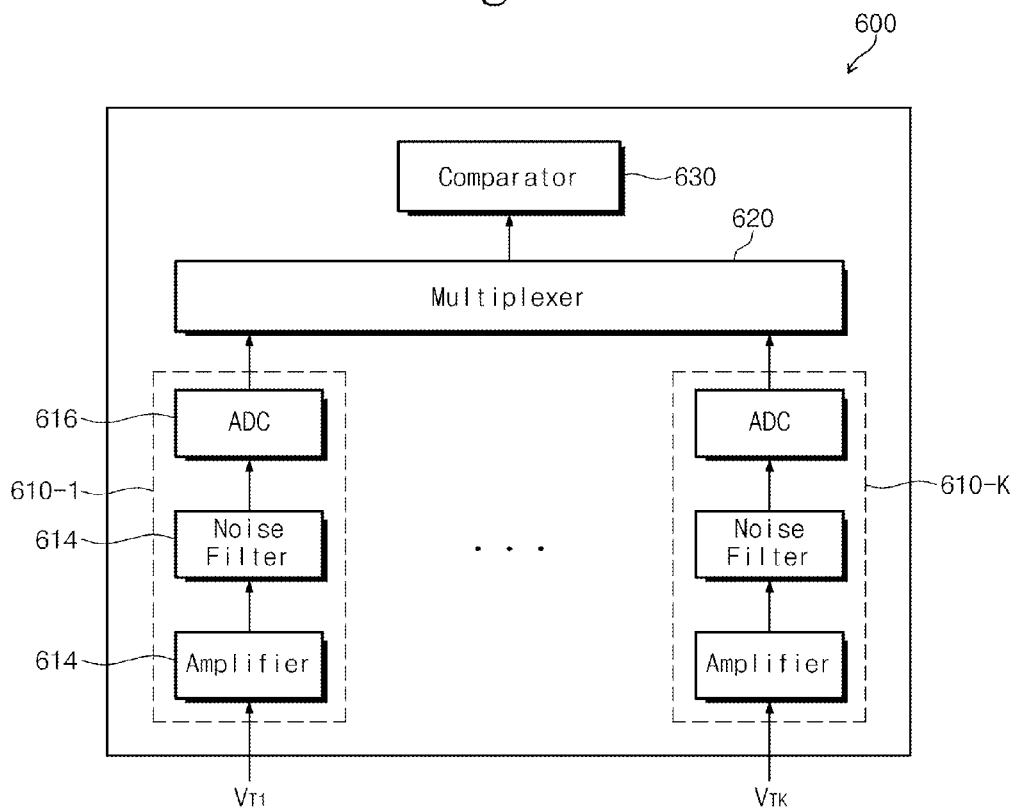
FIG. 8 is a block diagram showing a touch sensor shown in FIG. 7.

FIG. 7 is a plan view showing a connection relationship between the data lines shown in FIG. 5 and the first switching part shown in FIG. 6A, and FIG. 8 is a block diagram showing the touch sensor shown in FIG. 7. FIG. 7 shows k (k is an integer number equal to or greater than 2) first touch electrodes TEV1 to TEVk and k first switching parts 510-1 to 510-k.

Referring to FIG. 7, each of the first touch electrodes TEV1 to TEVk is configured by each of the first data line groups DL-G1 (refer to FIG. 5.). During the non-display period NDP, because the first data line groups DL-G1 do not receive the data voltages $V_{RGB}$ and the first data line groups DL-G1 are capacitively coupled to the common electrodes CE1 to CEr, the first data line groups DL-G1 functionally perform as the first touch electrodes TEV1 to TEVk. The k first switching parts 510-1 to 510-k apply the touch signals $V_{T1}$ to $V_{TK}$ from the first touch electrodes TEV1 to TEVk to the touch sensor 600.

Referring to FIG. 8, the touch sensor 600 includes signal processors 610-1 to 610-k that process the touch signals $V_{T1}$ to $V_{TK}$, a multiplexer 620, and a comparator 630.

Each of the signal processors 610-1 to 610-k includes an amplifier 612, a noise filter 614, and an analog-to-digital converter 616. The amplifier 612 amplifies a corresponding touch signal of the touch signals $V_{T1}$ to $V_{TK}$. The noise filter 614 removes noises of the amplified touch signal. The analog-to-digital converter 616 converts the touch signal, from which the noises are removed, to a digital signal.

The multiplexer 620 applies the digital signals from the signal processors 610-1 to 610-k to the comparator 630. The comparator 630 compares the digital signals to a reference value to detect the touch electrode, which is positioned at a position at which the touch event occurs, among the first touch electrodes TEV1 to TEVk.

Figure 9:
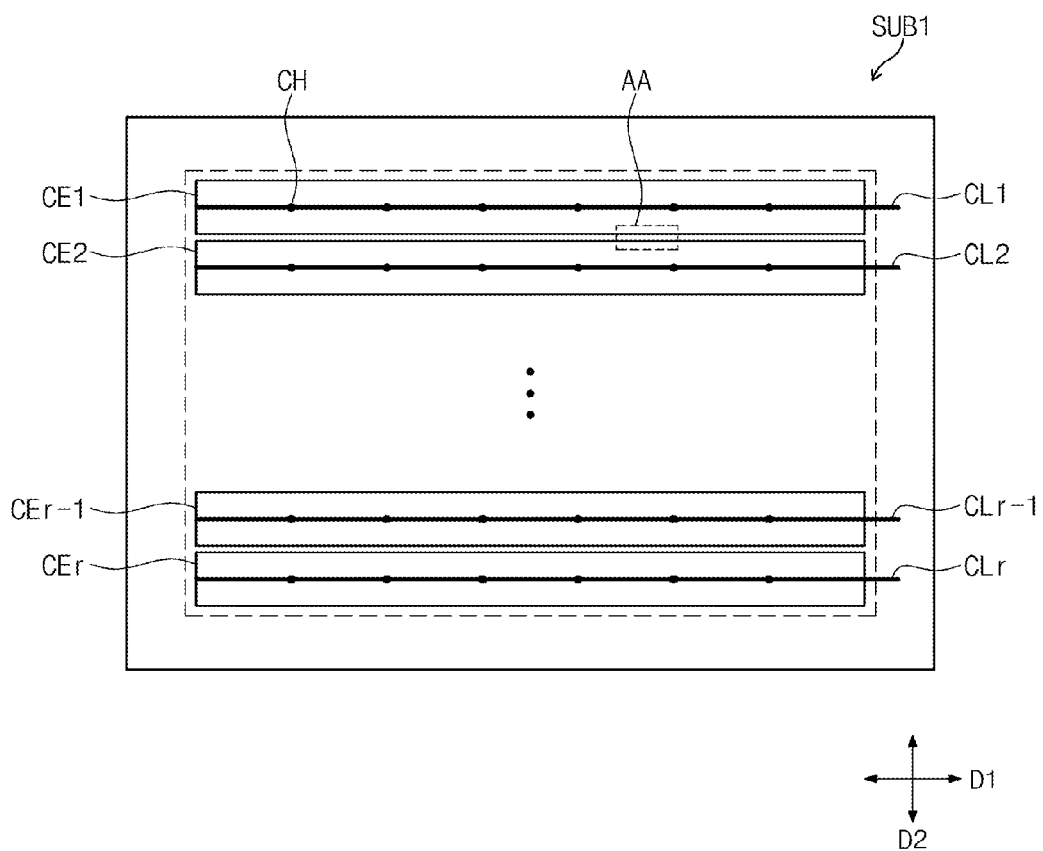
FIG. 9 is a plan view showing a plurality of common lines and a plurality of common electrodes.
Figure 10A:
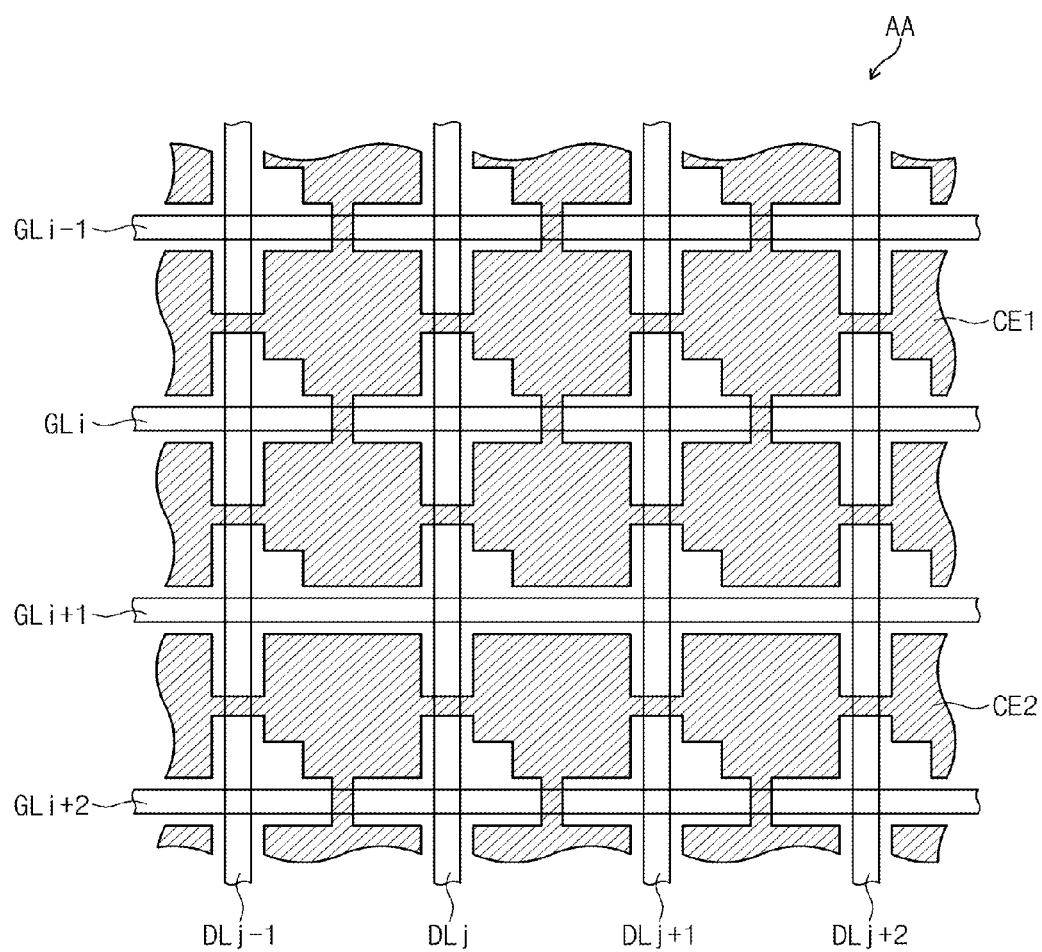
FIGS. 10A and 10B are partially enlarged plan views showing portions of the common lines and the common electrodes.
Figure 10B:
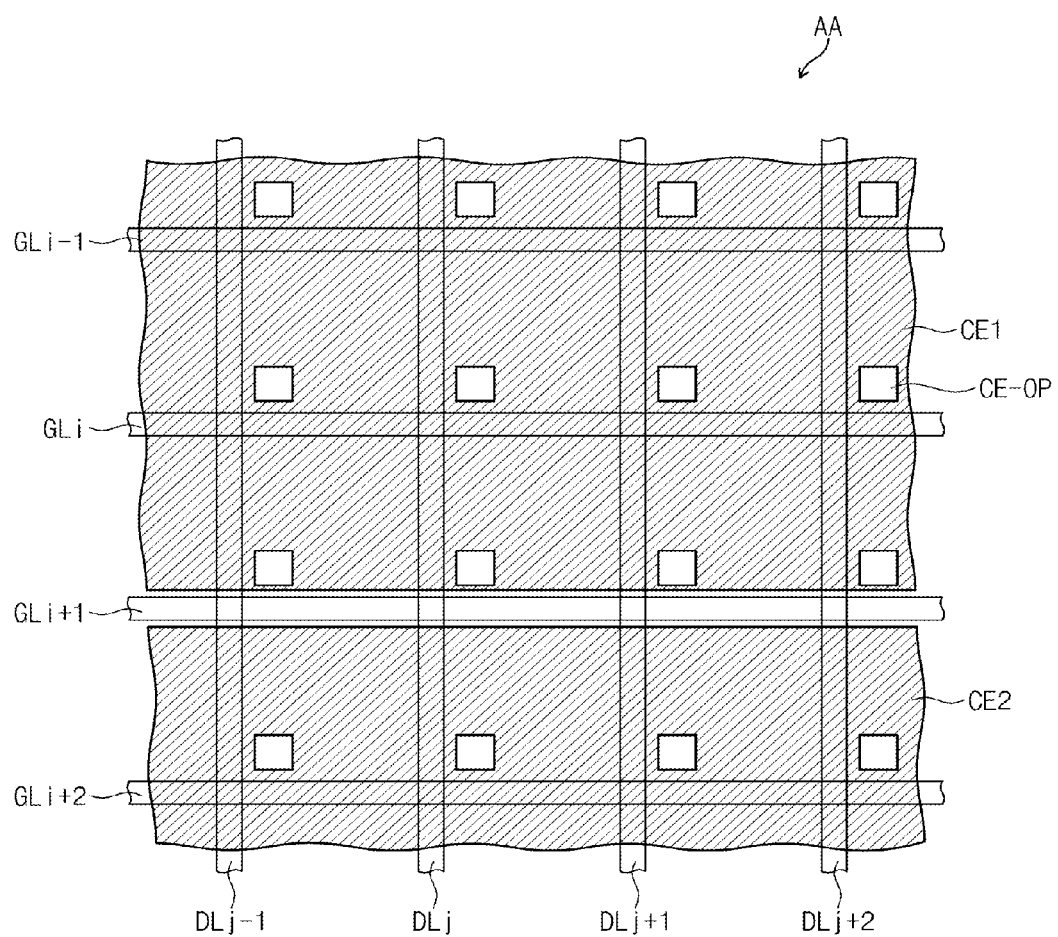

FIG. 9 is a plan view showing a plurality of common lines and a plurality of common electrodes, and FIGS. 10A and 10B are partially enlarged plan views showing portions of the common lines and the common electrodes.

Referring to FIG. 9, the common electrodes CE1 to CEr are shown where, e.g., r is an integer number equal to or greater than 2. Common electrodes CE1 to CEr, are extended in the first direction D1. The common electrodes CE1 to CEr are arranged in the second direction D2.

Each of the common electrodes CE1 to CEr is disposed in different pixel areas. As shown in FIGS. 10A and 10B, which show an expansion of area AA of FIG. 9, the shape of the common electrodes CE1 to CEr may be varied. The common electrodes CE1 to CEr may be patterned to remove a specific portion thereof. As shown in FIG. 10B, each of the common electrodes CE1 to CEr may have a plurality of openings CE-OP.

The common electrodes CE1 to CEr receive the reference voltage $V_R$ during the display period DP and receive the sensing signals $V_S$ during the non-display period NDP.

As shown in FIG. 9, the common lines CL1 to CLr are extended in the first direction D1 and arranged in the second direction D2. The common lines CL1 to CLr are disposed on a layer different from a layer on which the common electrodes CE1 to CEr are disposed.

The common lines CL1 to CLr are arranged to correspond to the common electrodes CE1 to CEr in a one-to-one correspondence. Each common line CL1 to CLr is electrically connected to a corresponding common electrode of the common electrodes CE1 to CEr through the contact hole CH.

The common lines CL1 to CLr receive the reference voltage $V_R$ during the display period DP and receive the sensing signals $V_S$ during the non-display period NDP.

The number of the common lines CL1 to CLr is variable. The number of the common lines CL1 to CLr may be the same as the number of the gate lines GL1 to GLn.

Figure 11:
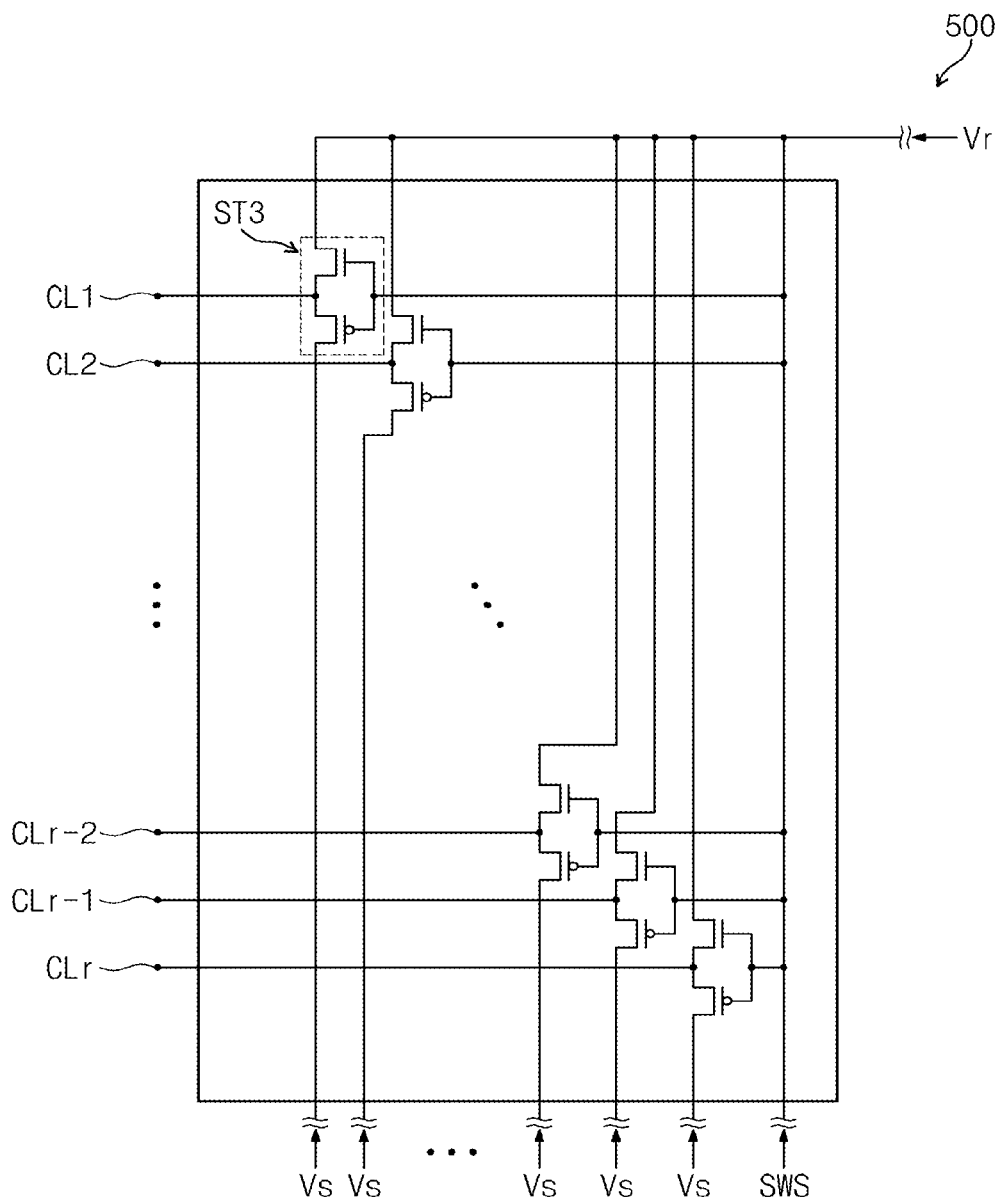
FIG. 11 is a circuit diagram showing a second driving controller shown in FIG. 1.

FIG. 11 is a circuit diagram showing the second driving controller shown in FIG. 1 and FIG. 12 is a plan view showing a connection relation between the common electrodes shown in FIG. 9 and the second driving controller shown in FIG. 11.

Referring to FIG. 11, the second driving controller 500 includes a plurality of switching devices ST3. The switching devices ST3 are connected to the common electrodes CE1 to CEr, respectively. Alternatively, the switching devices ST3 may be respectively connected to the common lines CL1 to CLr.

Each of the switching devices ST3 of the second driving controller 500 may be a CMOS transistor. The CMOS transistor includes an n-type MOS transistor and a p-type MOS transistor. A control electrode of the n-type MOS transistor is connected to a control electrode of the p-type MOS transistor to receive the switching signal SWS.

An input electrode of the n-type MOS transistor is applied with the reference voltage $V_R$. An input electrode of the p-type MOS transistor is applied with a corresponding sensing signal of the sensing signals $V_S$. An output electrode of the n-type MOS transistor and an output electrode of the p-type MOS transistor are commonly connected to a corresponding common electrode of the common electrodes CE1 to CEr.

When the switching signal SWS having an inverted phase is used, the connection relation of the n-type MOS transistor and the p-type MOS transistor may be changed.

As shown in FIG. 12, during the non-display period NDP, the common electrodes CE1 to CEr serve as r second touch electrodes TEH1 and TEHr extended in the first direction D1.

Figure 13:
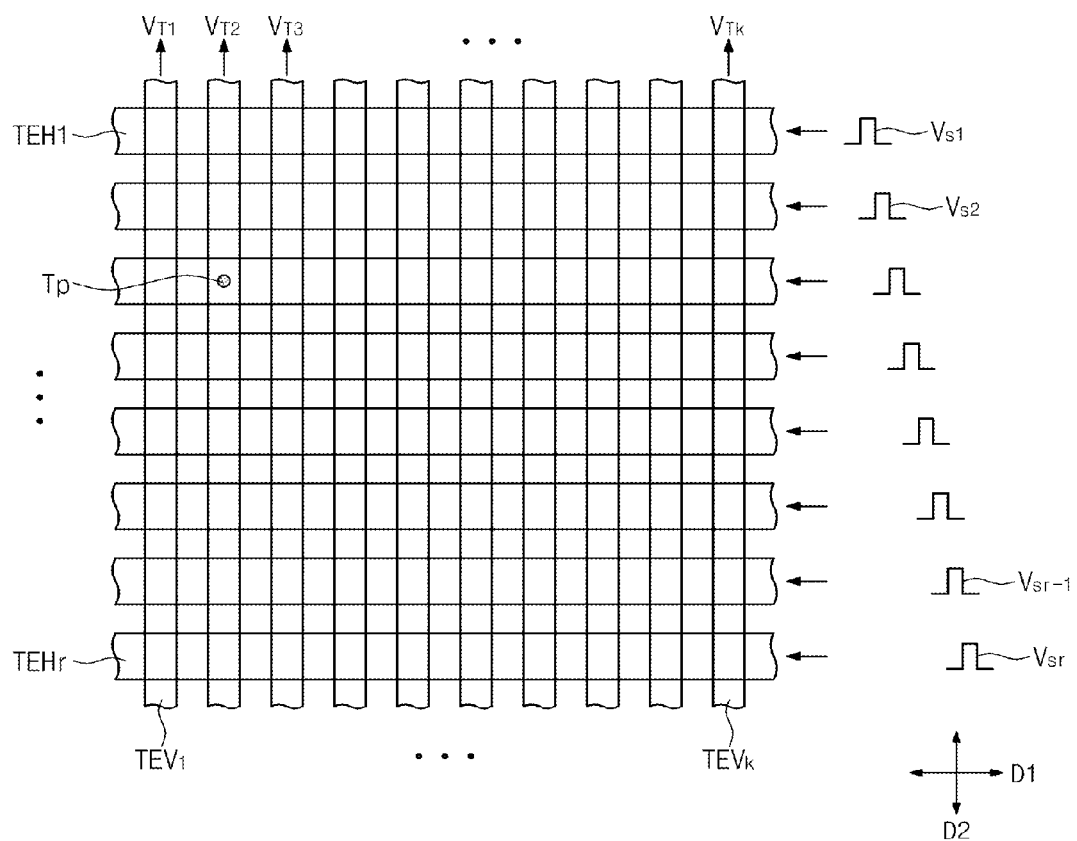
FIG. 13 is a plan view showing a touch event occurring on the display panel.

FIG. 13 is a plan view showing the touch event occurring on the display panel. For the convenience of explanation, it is assumed that the touch event Tp occurs at the cross point where a second electrode TEV2 of the first touch electrodes TEV1 to TEVk crosses a third electrode TEH3 of the second touch electrodes TEH1 to TEHr.

The activation periods, in which the sensing signals $V_{S1}$ to $V_{Sr}$ applied to the second touch electrodes TEH1 to TEHr are activated, are different from each other. The touch signal $V_{T2}$ detected from the second electrode TEV2 of the first touch electrodes TEV1 to TEVk has a level different from levels of the touch signals $V_{T1}$ and $V_{T3}$ to $V_{TK}$ detected from the other first touch electrodes TEV1 and TEV3 to TEVk.

The touch sensor 600 calculates two-dimensional coordinate information of the position at which the touch event Tp occurs on the basis of a detected time of the touch signal $V_{T2}$ and a relative position of the second electrode TEV2 to the first touch electrodes TEV1 to TEVk.

Figure 14:
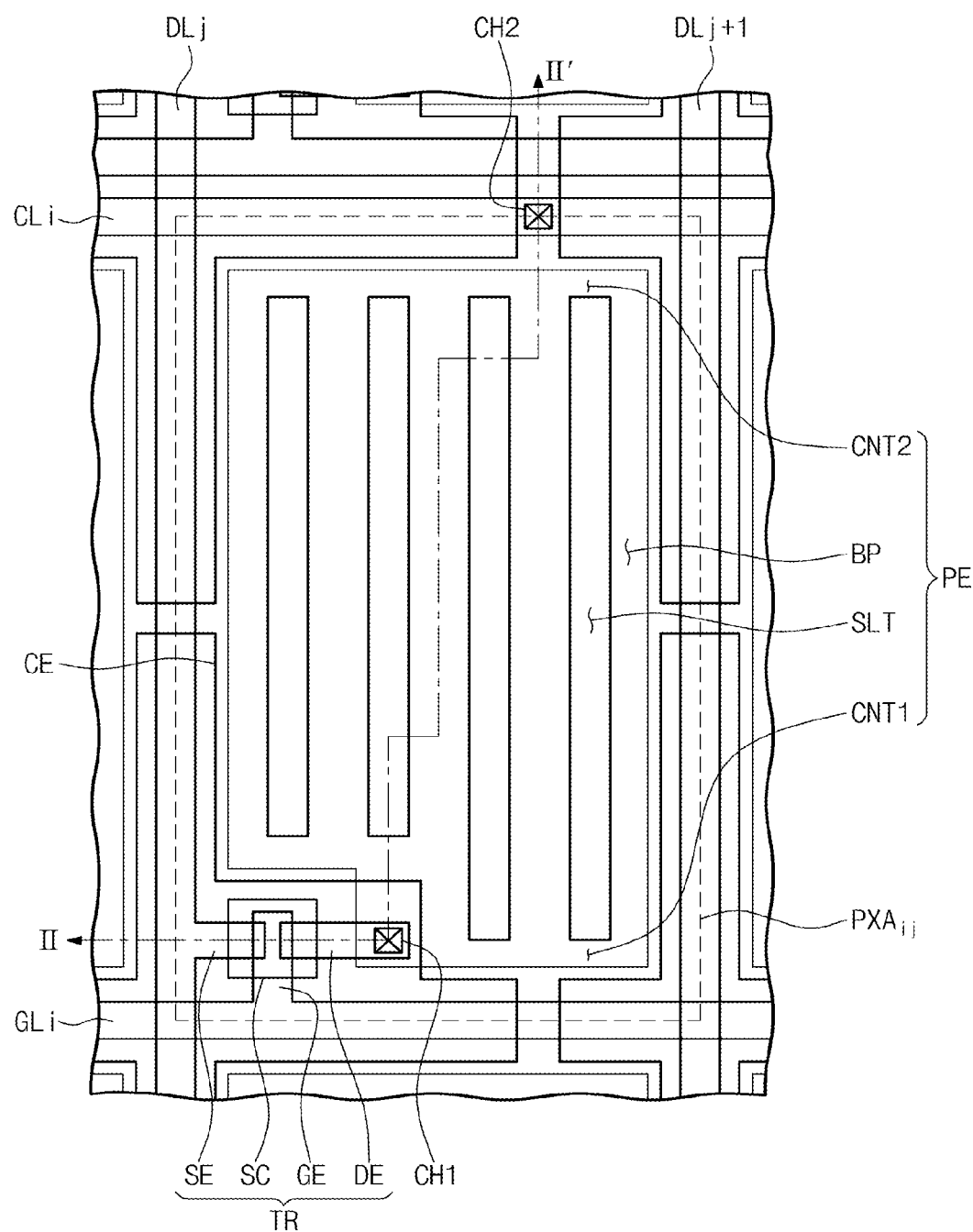
FIG. 14 is a plan view showing a pixel area of the display panel.
Figure 15:
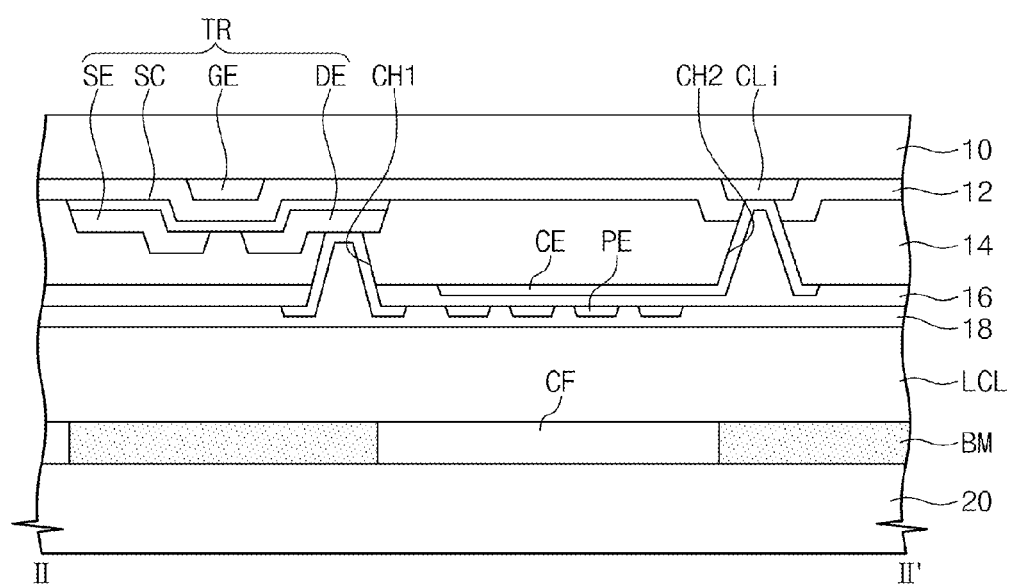
FIG. 15 is a cross-sectional view taken along a line II-II' of FIG. 14.

FIG. 14 is a plan view showing a pixel area of the display panel and FIG. 15 is a cross-sectional view taken along a line II-II' of FIG. 14.

Referring to FIGS. 14 and 15, the corresponding pixel is disposed in the pixel area PXAij. The pixel includes the thin film transistor TR and the pixel electrode PE connected to the thin film transistor TR.

The thin film transistor TR is connected to the i-th gate lines GLi and the j-th data line DLj. The thin film transistor TR includes a gate electrode GE, a source electrode SE, a drain electrode DE, and a semiconductor layer SC.

The pixel electrode PE includes a plurality of slits SLT and a plurality of branch portions BP alternately arranged with the slits SLT. First end portions of the branch portions BP are connected to each other by a first connection portion CNT1 and second end portions of the branch portions BP are connected to each other by a second connection portion CNT2. The first connection portion CNT1 is connected to the thin film transistor TR through a first contact hole CH1 and the second connection portion CNT2 may be omitted. The slits SLT and the branch portions BP have the bar shape as shown in FIG. 14, but they should not be limited to the bar shape. That is, the slits SLT and the branch portions BP may have a bent shape, e.g., a V shape.

The common electrode CE is disposed to correspond to the pixel area PXAij. The common electrode CE is connected to the i-th common line CLi through a second contact hole CH2. The second contact hole CH2 corresponds to one of the contact holes CH such as shown in FIG. 9.

The second substrate SUB2 includes a second base member 20, a color filter CF disposed on the second base member 20, and a black matrix BM disposed on the second base member 20.

Figure 16:
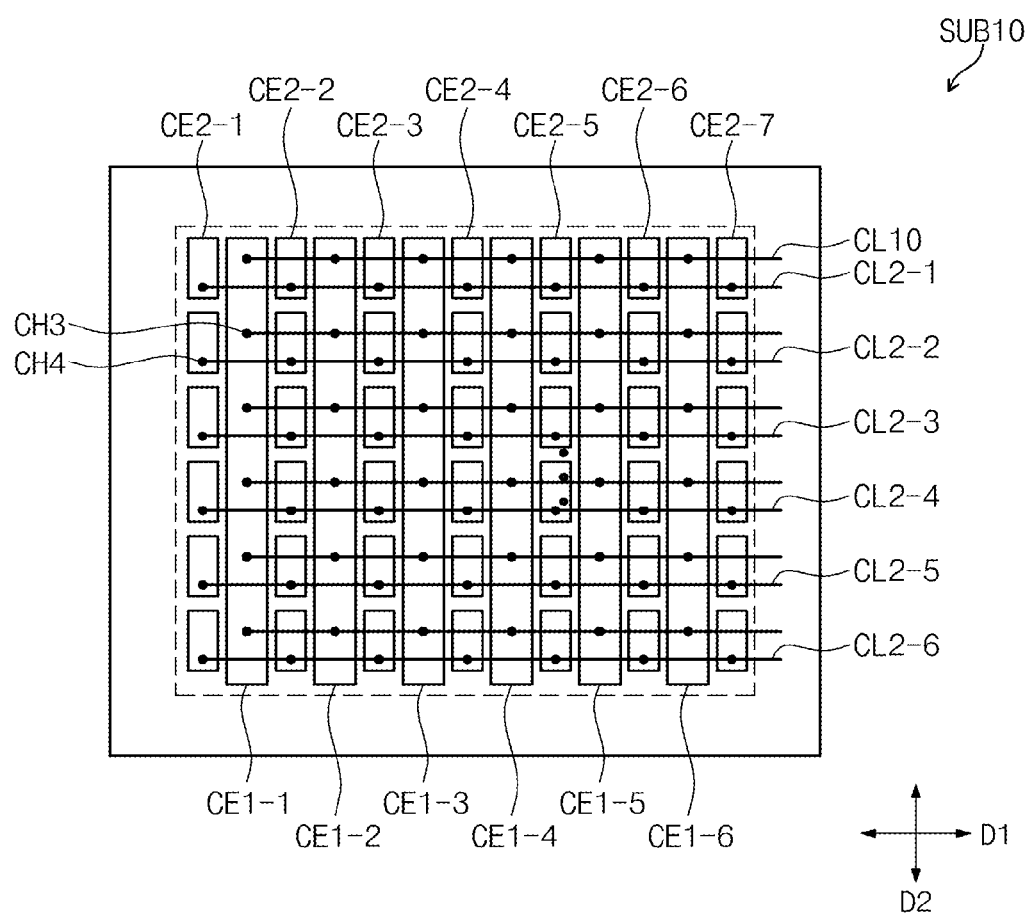
FIG. 16 is a plan view showing a plurality of common lines and a plurality of common electrodes according to an exemplary embodiment.
Figure 17:
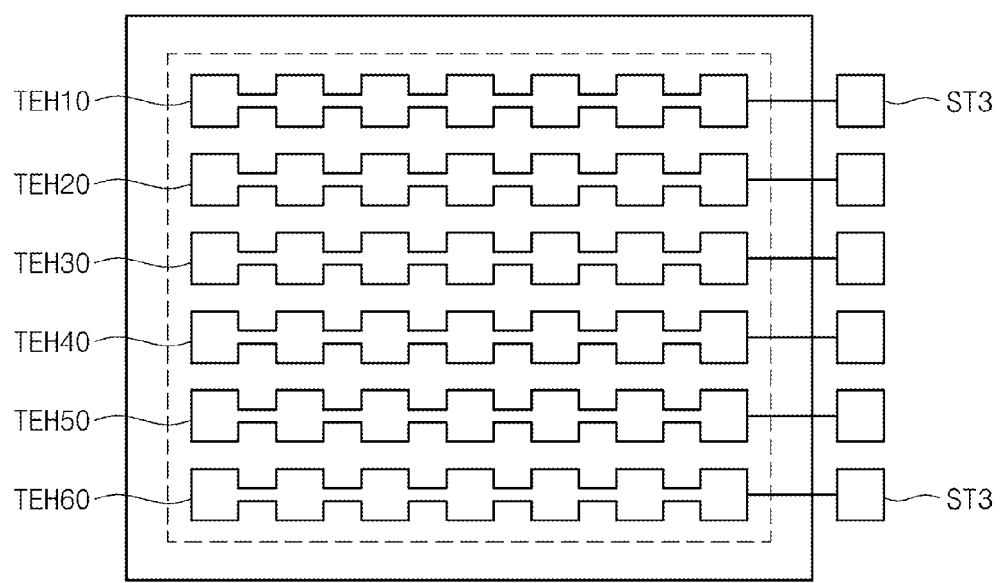
FIG. 17 is a plan view showing a connection relation between the common electrodes shown in FIG. 16 and a second driving controller.

FIG. 16 is a plan view showing a plurality of common lines and a plurality of common electrodes according to an exemplary embodiment, and FIG. 17 is a plan view showing a connection relationship between the common electrodes shown in FIG. 16 and a second driving controller. In FIGS. 16 and 17, the same reference numerals denote the same elements as in FIGS. 1 to 15, and thus detailed descriptions of the same elements will be omitted.

Referring to FIG. 16, the first substrate SUB10 includes a plurality of first common electrodes CE1-1 to CE1-6 and a plurality of second common electrodes CE2-1 to CE2-7.

The first common electrodes CE1-1 to CE1-6 are extended in the second direction D2 and arranged in the first direction D1. The first common electrodes CE1-1 to CE1-6 are overlapped with the first data line groups DL-G1 (refer to FIG. 5), respectively.

The second common electrodes CE2-1 to CE2-7 are overlapped with the second data line groups DL-G2 (refer to FIG. 5). Each of the second common electrodes CE2-1 to CE2-7 are divided into a plurality of groups based on an electrical connection thereof.

The plurality of groups are arranged in the second direction D2. Each of second common electrodes CE2-1 to CE2-7 are divided into groups of n (n is an integer number equal to or larger than 2) member electrodes. FIG. 16 shows, for example, each of the second common electrodes CE2-1 to CE2-7 divided into six groups, such that n=6 for each of the second common electrodes CE2-1 to CE2-7. In addition, there are seven second common electrodes CE2-1 to CE2-7, each divided into a group of n=6 member electrodes. Thus, the n member electrodes of each of the seven second common electrodes CE2-1 to CE2-7, arranged in direction D1, are all electrically connected, e.g., the first member electrodes of the each of the seven second common electrodes CE2-1 to CE2-7 are all connected to one common electrode line (CL2-1).

The member electrodes of each group of the seven second common electrodes CE2-1 to CE2-7 are electrically connected to each other and arranged in the first direction D1. The first common electrodes CE1-1 to CE1-6 are disposed between two adjacent second common electrodes.

The member electrodes of the second common electrodes CE2-1 to CE2-7 included in one group serve as one second touch electrode. As shown in FIG. 17, the second common electrodes CE2-1 to CE2-7 form the second touch electrodes TEH10 to TEH60.

The first common electrodes CE1-1 to CE1-6 receive the reference voltage $V_R$ during the display period DP and the non-display period NDP.

The second common electrodes CE2-1 to CE2-7 receive the reference voltage $V_R$ during the display period DP and receive the sensing signals $V_S$ during the non-display period NDP. The member electrodes of the second common electrodes CE2-1 to CE2-7 included in different groups receive the sensing signals $V_S$ activated in different periods, that is, the second touch electrodes TEH10 to TEH60 receive the sensing signals $V_S$ activated in different periods.

The first substrate SUB10 further includes at least one first common line CL10. FIG. 16 shows six first common lines CL10. Each of the first common lines CL10 connects the first common electrodes CE1-1 to CE1-6 through third contact holes CH3. The reference voltage $V_R$ is applied to the first common electrodes CE1-1 to CE1-6 through a corresponding first common line CL10.

The first substrate SUB10 further includes a plurality of second common lines CL2-1 to CL2-6. The second common lines CL2-1 to CL2-6 respectively correspond to the groups of the second common electrodes CE2-1 to CE2-7.

Each of the second common lines CL2-1 to CL2-6 connects the seven second common electrodes CE2-1 to CE2-7 included in the corresponding group of member electrodes. The second common lines CL2-1 to CL2-6 are connected to the second common electrodes CE2-1 to CE2-7 included in each group through fourth contact holes CH4.

The reference voltage $V_R$ and the sensing signals $V_S$ are applied to the second common electrodes CE2-1 to CE2-6 through the second common lines CL2-1 to CL2-6.

Figure 18:
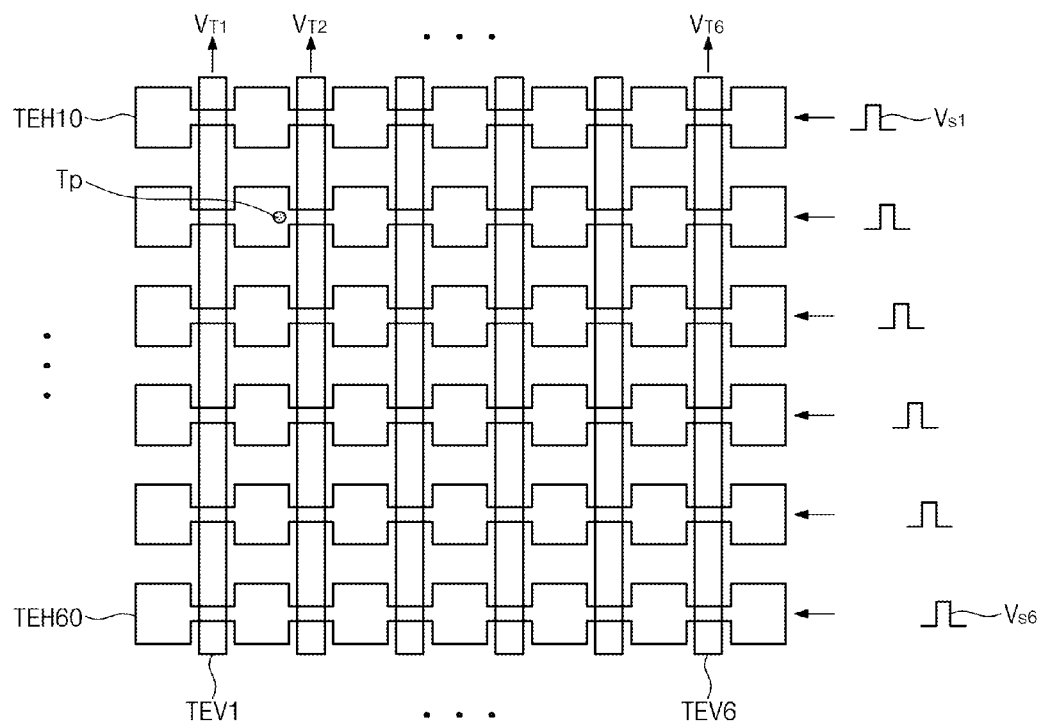
FIG. 18 is a plan view showing a touch event occurring on the display panel.

FIG. 18 is a plan view showing the touch event occurring on the display panel. For the convenience of explanation, it is assumed that the touch event Tp occurs at the cross point where the second electrode TEV2 of the first touch electrodes TEV1 to TEV6 crosses the second electrode TEH20 of the second touch electrodes TEH10 to TEH60.

The touch signal $V_{T2}$ detected from the second electrode TEV2 of the first touch electrodes TEV1 to TEV6 has a level different from levels of the touch signals $V_{T1}$ and $V_{T3}$ to $V_{T6}$ detected from the other first touch electrodes TEV1 and TEV3 to TEV6.

The touch sensor 600 calculates the two-dimensional coordinate information of the position at which the touch event Tp occurs on the basis of the detected time of the touch signal $V_{T2}$ and the relative position of the second electrode TEV2 to the first touch electrodes TEV1 to TEV6.

According to the display apparatus shown in FIGS. 16 to 18, the parasitic capacitance between the first touch electrodes TEV1 to TEV6 and the second touch electrodes TEH1 to TEH6 is reduced, and thus a touch sensitivity of the display apparatus is improved.

Although the exemplary embodiments have been described, it is understood that the present invention should not be limited to these exemplary embodiments but various changes and modifications can be made by one ordinary skilled in the art within the spirit and scope of the present disclosure, including the claims.

What is claimed is:

1. A display apparatus comprising:
    a display panel that includes a first substrate comprising an upper part on which a touch event occurs, a second substrate disposed under the first substrate, and a liquid crystal layer disposed between the first substrate and the second substrate; and
    a touch sensor that calculates coordinate information of a position at which the touch event occurs,
    wherein the first substrate comprises:
    a base substrate;
    a plurality of common electrodes disposed under the base substrate, the plurality of common electrodes receiving a reference voltage during a display period and receiving touch sensing signals during a non-display period;
    a plurality of pixel electrodes overlapping with the plurality of common electrodes;
    a plurality of data lines; and
    a plurality of gate lines extending in a direction crossing the plurality of data lines;
    wherein the plurality of data lines comprises:
    first data line groups that intersect with the plurality of common electrodes, the first data line groups receiving first data voltages during the display period and being capacitively coupled to the plurality of common electrodes during the non-display period; and
    second data line groups that are alternately arranged with the first data line groups and receive second data voltages during the display period.

2. The display apparatus of claim 1, wherein the plurality of pixel electrodes are disposed under the plurality of common electrodes.

3. The display apparatus of claim 2, wherein each of the plurality of pixel electrodes includes a plurality of slits.

4. The display apparatus of claim 1, further comprising:
    a first driving controller that applies the first and second data voltages to the display panel during the display period and applies a capacitance variation that occurs between the plurality of common electrodes and the first data line groups to the touch sensor during the non-display period; and
    a second driving controller that applies the reference voltage to the display panel during the display period and applies the touch sensing signals to the display panel during the non-display period.

5. The display apparatus of claim 4, wherein the first driving controller comprises a first switching part connected to data lines included in the first data line groups and a second switching part connected to data lines included in the second data line groups.

6. The display apparatus of claim 5, wherein the first switching part comprises a plurality of first switching devices respectively connected to the data lines included in the first data line groups, the plurality of first switching devices provides the first data voltages to the data lines included in the first data line groups during the display period, and the plurality of first switching devices transfers the capacitance variation from the data lines included in the first data line groups to the first driving controller.

7. The display apparatus of claim 6, wherein each of the plurality of first switching devices comprises a CMOS transistor.

8. The display apparatus of claim 7, wherein the CMOS transistor comprises an n-type transistor and a p-type transistor, a control electrode of the n-type transistor and a control electrode of the p-type transistor commonly receive a switching signal, one of the n-type transistor and the p-type transistor is turned on in accordance with a level of the switching signal, and the other one of the n-type transistor and the p-type transistor is turned off in accordance with the level of the switching signal.

9. The display apparatus of claim 8, wherein an output electrode of the n-type transistor and an input electrode of the p-type transistor are commonly connected to a corresponding data line of the first data line groups, one of the n-type transistor and the p-type transistor applies the first data voltages to the display panel, and the other one of the n-type transistor and the p-type transistor applies the capacitance variation to the touch sensor.

10. The display apparatus of claim 8, wherein an input electrode of the n-type transistor and an output electrode of the p-type transistor are commonly connected to a corresponding data line of the first data line groups, one of the n-type transistor and the p-type transistor applies the first data voltages to the display panel, and the other one of the n-type transistor and the p-type transistor applies the capacitance variation to the touch sensor.

11. The display apparatus of claim 5, wherein the second switching part comprises a plurality of second switching devices respectively connected to the data lines included in the second data line groups, the plurality of second switching devices provides the second data voltages to the data lines included in the second data line groups during the display period, and the plurality of second switching devices is electrically open to the data lines included in the second data line groups during the non-display period.

12. The display apparatus of claim 4, wherein the second driving controller comprises a plurality of CMOS transistors electrically connected to the plurality of common electrodes.

13. The display apparatus of claim 12, wherein the display panel further comprises a plurality of common lines respectively connected to the plurality of common electrodes.

14. The display apparatus of claim 13, wherein the plurality of common lines is disposed on a same layer as the plurality of gate lines.

15. The display apparatus of claim 13, wherein the CMOS transistors are respectively connected to the plurality of common lines.

16. The display apparatus of claim 15, wherein each of the CMOS transistors comprises an n-type transistor and a p-type transistor, a control electrode of the n-type transistor and a control electrode of the p-type transistor commonly receive a switching signal, one of the n-type transistor and the p-type transistor is turned on in accordance with a level of the switching signal, and the other one of the n-type transistor and the p-type transistor is turned off in accordance with the level of the switching signal.

17. The display apparatus of claim 16, wherein an output electrode of the n-type transistor and an input electrode of the p-type transistor are commonly connected to a corresponding common line of the plurality of common lines, one of the n-type transistor and the p-type transistor applies the reference voltage to the common line, and the other one of the n-type transistor and the p-type transistor applies the sensing signal to the common line.

18. The display apparatus of claim 16, wherein an input electrode of the n-type transistor and an output electrode of the p-type transistor are commonly connected to a corresponding common line of the plurality of common lines, one of the n-type transistor and the p-type transistor applies the reference voltage to the common line, and the other one of the n-type transistor and the p-type transistor applies the sensing signal to the common line.

* * * * *